United States Patent [19]
Ryan et al.

[11] 3,909,248
[45] Sept. 30, 1975

[54] SEPARATION OF NICKEL FROM COPPER

[75] Inventors: Peter John Ryan, Mississauga;
Gerald Vernon Glaum, Oakville;
Einar Walli, Burlington, all of Canada

[73] Assignee: The International Nickel Company, Inc., New York, N.Y.

[22] Filed: May 4, 1973

[21] Appl. No.: 357,347

[30] Foreign Application Priority Data
May 8, 1972 Canada .................................. 141596

[52] U.S. Cl. ................... 75/101 R; 75/108; 75/117; 75/119; 423/34; 423/150
[51] Int. Cl.² ..................... C22B 3/00; C22B 23/04
[58] Field of Search ................................ 423/34–37, 423/150; 75/101 R, 108, 115, 117–119

[56] References Cited
UNITED STATES PATENTS

| | | | |
|---|---|---|---|
| 2,898,196 | 8/1959 | Forward et al. | 23/224 |
| 2,898,197 | 8/1959 | Forward et al. | 23/224 |
| 3,293,027 | 12/1966 | Mackiw et al. | 75/115 X |
| 3,637,371 | 1/1972 | Mackiw et al. | 75/115 X |
| 3,652,265 | 3/1972 | Marschik et al. | 75/117 |
| 3,741,752 | 6/1973 | Evans et al. | 423/37 X |
| 3,761,566 | 9/1970 | Michal | 75/115 X |
| 3,773,891 | 11/1973 | O'Neill | 75/115 X |

FOREIGN PATENTS OR APPLICATIONS
855,218  11/1960  United Kingdom ................. 75/101

*Primary Examiner*—Allen B. Curtis
*Assistant Examiner*—Thomas A. Waltz
*Attorney, Agent, or Firm*—Miriam W. Leff; Ewan C. MacQueen

[57] ABSTRACT

Nickel contained in nickeliferous sulfide minerals is separated from cupriferous sulfide minerals and gangue, both of which sulfide minerals are associated with iron sulfides corresponding to the formula $Fe_xS_{x+1}$ wherein $x$ is an integer greater than 1, by forming an aqueous slurry of the mineral and iron sulfides and heating the slurry under a partial pressure of oxygen of at least 3 atmospheres to a temperature above about 80°C. but below the melting point of sulfur to oxidize the iron sulfide to iron hydroxide and elemental sulfur and to oxidize and dissolve the nickel contained in the nickeliferous minerals to produce a pregnant solution without oxidizing the cupriferous minerals. The cupriferous minerals are collected by melting the elemental sulfur, and nickel is recovered from the pregnant solution.

14 Claims, No Drawings

SEPARATION OF NICKEL FROM COPPER

The present invention relates to the separation of nickel contained in nickeliferous sulfide minerals from cupriferous sulfide minerals, both of which minerals are associated with iron sulfides, and more particularly, to a hydrometallurgical process for recovering nickel contained in nickeliferous sulfide minerals and for producing a high grade copper concentrate.

Copper is inevitably present in nickeliferous sulfide ores and must during some processing stage be separated from the nickel or nickel-containing concentrate or intermediate. In addition to copper, iron is also present in nickel sulfide ores as pentlandite (NiFeS$_2$) and pyrrhotite (Fe$_7$S$_8$).

Nickeliferous sulfide ores, after suitable grinding, are generally floated to provide a nickel-copper rougher concentrate, which is subsequently selectively floated to provide separate nickel and copper concentrates, and a rougher tailing that contains most of the pyrrhotite.

Small but material amounts of nickel and copper are associated with the pyrrhotite contained in nickeliferous sulfide concentrates. Nickel and copper associated with such pyrrhotite are predominantly present in the form of pentlandite and chalcopyrite, these minerals not having been liberated by prior milling operations. Pyrrhotite along with associated pentlandite and chalcopyrite can contain from about 0.5 up to about 2% nickel and from about 0.02 up to about 1% copper. Likewise, and particularly for nickel concentrates, the rougher concentrates and the nickel and copper concentrates can contain substantial amounts of non-liberated pyrrhotite, from about 5 up to about 60%, by weight. Although pyrrhotite itself might not contain sufficient nickel and copper values to warrant separate treatment for the recovery of these non-ferrous values, the associated pentlandite and chalcopyrite values can make treatment of such pyrrhotite desirable. Thus, the rougher tailings are floated to produce a pyrrhotite concentrate that can be treated to recover nickel and copper and to produce iron ore.

Because pyrrhotite contains only small amounts of nickel and copper, it is not ordinarily treated by conventional techniques. The large amounts of iron characteristic of pyrrhotite place uneconomical burdens on conventional smelting furnaces and create environmental problems since large quantities of sulfur dioxide are produced. Likewise, treatment of pyrrhotite concentrates by hydrometallurgical techniques can involve undue consumption of leaching reagents.

It has now been discovered that nickel and copper associated with the pyrrhotite in concentrates can be recovered and separated from each other while the major portion of sulfur associated with the pyrrhotite can be fixed in a readily storable and transportable form. Concentrates containing pyrrhotite and nickel and copper values are oxidatively leached while exercising special control of the pH of the solution, of the temperature, time, and of the oxygen partial pressure among other parameters to produce readily storable and transportable elemental sulfur, nickel sulfate solutions from which nickel can be recovered and a high grade copper concentrate which can be subsequently treated for copper recovery.

Generally speaking, the present invention contemplates a process for separating nickel contained in nickeliferous sulfide minerals from copper contained in cupriferous sulfide minerals both of which are associated with iron sulfides corresponding to the formula Fe$_x$S$_{x+1}$ wherein $x$ is a whole number greater than 1. A slurry of the nickeliferous and cupriferous sulfide minerals associated with the iron sulfides is established in an autoclave. A free-oxygen-containing atmosphere having an oxygen partial pressure of at least about 3 atmospheres is established over the slurry, and the slurry is maintained at a temperature above about 80°C. but below the melting point of sulfur. The slurry is vigorously agitated to uniformly disperse solids in the slurry, to maximize oxygen transfer into the aqueous slurry from the atmosphere, and to oxidize iron sulfides and nickeliferous sulfide minerals to provide an aqueous slurry containing the oxidized nickel as dissolved nickel sulfate and iron hydroxide solids. The oxidation reactions are terminated when a preponderant part of the iron sulfides and the nickeliferous sulfide minerals have been oxidized while the cupriferous sulfide minerals remain substantially unoxidized. Nickel is recovered from the nickel sulfate solution and the unoxidized cupriferous sulfide minerals are recovered as a high grade copper concentrate.

As used herein, the phrase "iron sulfides corresponding to the formula Fe$_x$S$_{x+1}$ wherein $x$ is a whole number greater than 1" includes naturally occurring pyrrhotite and pyritic minerals, including iron pyrites and chalcopyrite, that have been thermally treated to drive off the labile sulfur atom. Nickeliferous sulfide minerals that can be treated by the process in accordance with the present invention include pentlandite, millerite, heazlewoodite, polydymite, violarite, and siegenite as well as nickel arsenides. Cupriferous sulfide minerals that can be concentrated in accordance with the present invention include chalcocite, chalcopyrite, cubanite, and bornite. Ores containing pyrrhotite can be employed without any preliminary treatment except grinding, but economies in terms of apparatus requirements and materials handling are gained by treating pyrrhotite concentrates that are produced by magnetic separation techniques, flotation or a combination thereof. Best results in terms of better separation of nickel and copper and increased recovery of precious metaals in the copper concentrate are realized in treating pyrrhotite flotation concentrates.

The iron sulfide along with the associated nonferrous sulfide minerals is comminuted to at least about 100% minus 20 mesh Tyler Screen Size (T.S.S.) in order to insure good solid-liquid and solid-gas contact and dispersion and to insure good separation of nickel from copper with corresponding high grade copper concentrates being obtained. Sulfide concentrates derived from prior flotation treatments are generally sufficiently finely divided to insure all the foregoing objectives and no further grinding is required. However, in some instances, it can be advantageous to grind the concentrates to at least about 100% minus 100 mesh T.S.S. to insure substantially complete dissolution of the nickel values, substantially complete oxidation of the iron sulfide, and production of a high grade copper concentrate. The importance of the iron sulfide particle size will be demonstrated hereinafter.

The finely divided ore or ore concentrate is slurried with water and fed to an autoclave. To provide high throughput rate while minimizing equipment requirements the density of the slurry is maintained between about 5% solids and 50% solids, and advantageously between about 20% solids and 40% solids. Slurries with densities within the foregoing ranges provide high throughput rates, insure good gas-solid and liquid-solid contact and minimize materials handling problems.

The iron sulfide slurry can be formed from water, acidic sulfate solutions or recycled solutions as described hereinafter. Oxidation of iron sulfide in the aqueous phase produces iron sulfate solutions that hydrolyze to produce iron hydroxide and sulfuric acid when the pH value of the aqueous phase falls to below about 4 and iron sulfide is thereafter oxidized to iron hydroxide and elemental sulfur. Thus, in order to accelerate the initial oxidation of iron and nickel sulfides, aqueous solutions of sulfuric acid (or iron sulfate equivalents) in amounts between about 1 gram per liter (gpl) and 50 gpl can be employed in forming the slurry.

The iron sulfide slurry is fed to an autoclave. The autoclave is closed and a free-oxygen-containing atmosphere having an oxygen partial pressure of at least 3 atmospheres is established over the slurry. Lower oxygen partial pressures can be employed but the rate of reaction becomes commercially unattractive. Advantageously, oxygen partial pressures of at least about 10 atmosphers and advantageously between about 10 atmospheres and 30 atmospheres are established over the slurry in order to insure rapid iron and nickel sulfide oxidation and the production of sufficient amounts of sulfur to collect the unoxidized copper sulfide minerals.

An important feature of the present invention is the iron sulfide oxidation temperature employed. The slurry is heated to a temperature of at least about 80°C. in order to insure commercially attractive rates of reaction but below the melting point of sulfur (about 112°C.) in order to insure the complete oxidation of the nickel sulfide minerals. If the slurry is heated to temperatures above the melting point of sulfur before the oxidation of nickel sulfide minerals is substantially complete, molten sulfur coates the nickeliferous sulfide minerals thereby preventing oxidation and dissolution thereof and no separation of nickeliferous minerals from cupriferous minerals is realized. Advantageously, the slurry is heated to a temperature between 90° and 110°C. to insure substantially complete oxidation of the iron sulfide, to insure a high grade copper concentrate and to substantially completely oxidize and dissolve the nickeliferous sulfide minerals to thereby insure a good separation of nickel from copper.

Another important feature of the present invention is the vigorous agitation of the heated slurry in order to insure complete and rapid oxidation of the iron sulfide and the nickeliferous silfide minerals. The slurry should be sufficiently agitated to insure a slurry of uniform density and to incorporate oxygen into the slurry as it is demanded by the reactions occurring therein. For example, when the slurry is treated in an autoclave provided with rotating impellers for agitation, the impellers are rotated at speeds sufficient to create a vortex so that oxygen can be drawn into the slurry through the vortex. Of course, the slurry can be adequately agitated by pneumatic means, e.g., introducing oxygen or a free-oxygen-containing gas into the slurry through a porous plug at the bottom of the autoclave.

As noted hereinbefore, the iron sulfide is oxidized to hydrated iron hydroxide and elemental sulfur. The production of elemental sulfur is advantageous in that after the oxidation reactions are substantially completed the slurry can be heated to temperatures above the melting point of sulfur and the molten sulfur will coat unoxidized cupriferous sulfide minerals and any precious metals associated with the ore or ore concentrate being treated. When the slurry is heated to above the melting point of sulfur, it is agitated to insure that the unoxidized cupriferous sulfide minerals and any precious metals are coated with the molten sulfur and during cooling to insure the production of readily separable elemental sulfur pellets that contain the cupriferous sulfide minerals and any precious metals. The production of pellets during cooling is highly advantageous in that it facilitates the separation of sulfur from the difficult to filter iron hydroxide. Advantageously, this collecting operation is conducted by heating the slurry to a temperature between about 120° and 200°C. Higher temperatures within the foregoing range are advantageously employed because additional iron is precipitated from solution at these temperatures and the iron hydroxide product is rendered more easily separable by conventional solid-liquid techniques when precipitated or treated at these temperatures.

After heating the slurry to temperatures above the melting point of sulfur to coat the cupriferous sulfide minerals and any precious metals associated with the starting material with elemental sulfur for subsequent collection, the slurry is cooled to below the melting point of sulfur and the sulfur pellets are separated from the iron hydroxide for recovery of the cupriferous sulfide minerals. The separation is achieved by screening, hydrocloning, centrifuging, rake classifying or flotation. Alternatively, the slurry after oxidation can be discharged and the cupriferous sulfides, elemental sulfur, and the precious metals floated away from the iron hydroxide and gangue tailings. Sulfur can be separated from the cupriferous sulfide minerals and any precious metals by melting and filtration or by volatilization (e.g., in a fluidized bed) or by solvent extraction.

After filtration, the aqueous solution containing dissolved nickel values can be treated for nickel recovery. Nickel can be recovered from the acidic aqueous sulfate solution as nickel hydroxide or basic nickel carbonate by adding sodium hydroxide or sodium carbonate or any other base, preferably after oxidizing and precipitating iron values contained in the solution. Alternatively, the dissolved nickel values can be recovered as nickel sulfide by hydrogen sulfide precipitation by employment of elevated temperatures and pressures along with recycled previously precipitated nickel sulfide. As a further alternative, concentrated nickel-containing solution could be formed by use of organic extractants, and nickel can then be economically recovered in a purified form from the concentrated solution. In some instances, the nickel-containing solutions derived from the oxidation reactions contains only small amounts of nickel and the treatment of the entire solution for nickel recovery may be unecomonical. Therefore, it can be advantageous to split the nickel-containing solution from the oxidation leaching into two streams with one stream being treated for nickel recovery while the remainder is recycled to the oxidation leaching reaction. By this technique, solutions more concentrated in nickel are obtained.

In order to give those skilled in the art a better appreciation of the advantages flowing from the use of the process in accordance with the present invention the following illustrative examples are given:

EXAMPLE I

A bulk concentrate having the assay given in Table I and having a particle size distribution of 33% plus 100 mesh TSS was pulped with water to give a slurry containing 17% solids, by weight, and the slurry was fed to an impeller-equipped autoclave. The slurry was heated to 110°C. under an an oxygen partial pressure of about 20 atmospheres and a total pressure of about 21.5 atmospheres gauge while the impeller was rotated at 800 revolutions per minute (rpm). After 1.5 hours, the slurry was heated to 125°C. for 15 minutes to melt the liberated sulfur which upon cooling with agitation produced pellets. The sulfur pellets, tailings of iron oxide and gangue and the leach solution were discharged from the autoclave; and after liquid-solid separation and screening on a 65 mesh TSS screen, the various fractions were analyzed with the results being reported in Table I. The results given in Table I confirm that substantially all of the pyrrhotite (94.5% of the iron in the tailings) was degraded, that a preponderant part (69.6%) of the total sulfide sulfur (TS) was recovered as elemental sulfur, that a major amount (78.7%) of the nickel in the bulk concentrate was dissolved and recovered in the leach solution and that only a small amount (16.8%) of the copper was dissolved. The tailings could have been further cleaned by flotation to recover residual nickel and copper values, and a copper concentrate containabout 16% copper and 3% nickel could have been recovered upon separation by known means from the sulfur pellets.

slurry containing 30% solids, by weight. The slurry was treated in a manner similar to that described in Example I, and the results are reported in Table II. Comparison of the results in Tables I and II reveals that nickel recoveries in the leach solution are improved when the feed material has a smaller particle size and that leach solutions more concentrated in nickel are obtained by employing higher density slurries. It should be noted, however, that with a feed material having a finer particle size the separation of nickel from copper is less distinct. A copper concentrate containing about 8% copper and 2% nickel could have been recovered upon separation of the sulfide minerals from the sulfur pellets by known means.

EXAMPLE III

Two samples, A and B, of a high copper pyrrhotite concentrate having the assays given in Tables IIIA and IIIB and having a particle size distribution of 8% plus 200 mesh TSS were pulped with equal volumes of water and recycle makeup solutions to give slurries containing 30% solids, by weight. The slurries were treated in a manner similar to that described in Example I, except that sample B was treated for 2.5 hours rather than 1.5 hours. The results of the test on sample A are reported in Table IIIA, while the results for sample B are shown in Table IIIB.

Comparison of the results in Tables IIIA and IIIB shows that increased leaching times improve nickel recoveries in the leaching solutions. Even though somewhat more copper was dissolved from sample B, the

TABLE I

| Fraction | Wt. or Vol. | Analysis of Fraction,[1] %, gpl | | | | | | Distribution[2], % | | | | | |
|---|---|---|---|---|---|---|---|---|---|---|---|---|---|
| | | Cu | Ni | Fe | TS | S° | SO$_4$ | Cu | Ni | Fe | TS | S° | SO$_4$ |
| Feed Solids | 300 g. | 1.13 | 0.98 | 7.9 | 21.7 | — | — | 100 | 100 | 100 | 100 | — | — |
| Leach solution | 1.5 l. | 0.40 | 1.55 | 091.23 | 6.13 | — | 18.4 | 16.8 | 78.7 | 1.7 | 14.4 | — | 14.4 |
| + 65 mesh pellets | 58.4 g. | 4.19 | 0.76 | 096.84 | 84.4 | 74.8 | 0.10 | 68.4 | 15.0 | 3.8 | 77.4 | 68.6 | 0.1 |
| − 65 mesh tailings | 277.2 g. | 0.19 | 0.067 | 6.5 | 1.88 | 0.22 | 3.43 | 14.8 | 6.3 | 94.5 | 8.2 | 1.0 | 5.0 |

[1]Analyses of solid Fractions are given in weight percent while analyses of liquid Fractions are given in grams per liter (gpl).
[2]Distribution is the percentage of the constituent reporting in the various Fractions, based on the amount initially present in Feed Fraction.

TABLE II

| Fraction | Wt. or Vol. | Analysis of Fraction,[1] %, gpl | | | | | | Distribution[2], % | | | | | |
|---|---|---|---|---|---|---|---|---|---|---|---|---|---|
| | | Cu | Ni | Fe | TS | S° | SO$_4$ | Cu | Ni | Fe | TS | S° | SO$_4$ |
| Feed Solids | 600 g. | 0.13 | 1.15 | 5.8 | 36.7 | — | — | 100 | 100 | 100 | 100 | 100 | 100 |
| Leach Solution | 1.4 l. | 0.17 | 4.37 | 4.9 | 17.5 | — | 52.6 | 29.6 | 92.6 | 6.2 | 11.4 | — | 11.4 |
| + 65 mesh pellets | 166.8 g. | 0.28 | 0.055 | 090.70 | 99.8 | 96.9 | — | 57.8 | 1.4 | 0.3 | 77.5 | 75.5 | — |
| − 65 mesh tailings | 600 g. | 0.017 | 0.066 | 2.5 | 3.97 | 1.49 | 4.48 | 12.6 | 6.0 | 93.5 | 11.1 | 4.2 | 4.1 |

[1]Analyses of solid Fractions are given in weight percent while analyses of liquid Fractions are given in grams per liter (gpl).
[2]Distribution is the percentage of the constituent reporting in the various Fractions, based on the amount initially present in Feed Fraction.

EXAMPLE II

A pyrrhotite concentrate having the assay given in Table II and having a particle size distribution of 7% plus 200 mesh TSS was pulped with water to give a leach solution still had a nickel to copper ratio of about 10:1, almost a fourfold improvement from the nickel to copper ratio of 2.5:1 in the pyrrhotite concentrate. A copper concentrate containing about 20% copper and 1% nickel could have been recovered upon separation of the sulfide minerals from the sulfur pellets by known means.

same manner described in Example I except that sample D was leached for 2 hours rather than 1.5 hours.

TABLE III-A

| Fraction | Wt. or Vol. | Analysis of Fraction,[1] % gpl | | | | | | Distribution[2], % | | | | | |
|---|---|---|---|---|---|---|---|---|---|---|---|---|---|
| | | Cu | Ni | Fe | TS | S° | SO₄ | Cu | Ni | Fe | TS | S° | SO₄ |
| Feed Solids | 600 g. | 0.55 | 1.27 | 3.4 | 2.9 | — | — | 100 | 100 | 100 | 100 | — | — |
| Make-up solution | 1.4 l. | 0.08 | 3.33 | 091.11 | 094.87 | — | 14.6 | — | — | — | — | — | — |
| Leach solution | 1.4 l. | 0.60 | 7.79 | 4.0 | 1.3 | — | 63.9 | 19.8 | 87.8 | 5.7 | 11.5 | — | 11.5 |
| + 65 mesh pellets | 167.5 g. | 1.50 | 0.23 | 093.71 | 3.1 | 89.1 | — | 68.3 | 5.3 | 2.0 | 77.9 | 74.6 | — |
| − 65 mesh tailings | 578 g. | 0.076 | 0.085 | 0.5 | 093.67 | <0.1 | 8.53 | 11.9 | 6.9 | 92.3 | 10.6 | — | 8.2 |

[1] Analyses of solid Fractions are given in weight percent while analyses of liquid Fractions are given in grams per liter (gpl).
[2] Distribution is the percentage of the constituent reporting in the various Fractions, based on the amount initially present in Feed Fraction.

TABLE III-B

| Fraction | Wt. or Vol. | Analysis of Fraction,[1] % gpl | | | | | | Distribution[2], % | | | | | |
|---|---|---|---|---|---|---|---|---|---|---|---|---|---|
| | | Cu | Ni | Fe | TS | S° | SO₄ | Cu | Ni | Fe | TS | S° | SO₄ |
| Feed solids | 600 g. | 0.55 | 1.27 | 3.4 | 32.9 | — | — | 100 | 100 | 100 | 100 | — | — |
| Make-up solution | 1.4 l. | 0.08 | 3.33 | 091.11 | 4.87 | — | 14.6 | — | — | — | — | — | — |
| Leach solution | 1.4 l. | 0.81 | 8.43 | 2.9 | 22.1 | — | 66.3 | 29.6 | 93.7 | 5.1 | 12.0 | — | 12.0 |
| + 65 mesh pellets | 162.6 g. | 1.22 | 0.042 | 091.58 | 94.9 | 94.3 | — | 57.3 | 0.9 | 0.8 | 76.9 | 76.4 | — |
| − 65 mesh tailings | 583.4 g. | 0.078 | 0.070 | 2.5 | 3.79 | <0.1 | 8.88 | 13.1 | 5.4 | 94.1 | 11.0 | — | 8.6 |

[1] Analyses of solid Fractions are given in weight percent while analyses of liquid Fractions are given in grams per liter (gpl)
[2] Distribution is the percentage of the constituent reporting in the various Fractions, based on the amount initially present in Feed Fraction.

EXAMPLE IV

Two samples, C and D of low nickel and high nickel concentrates, respectively, having the assays given in Tables IVC and IVD, respectively, and having a particle size distribution of 100% minus 325 mesh TSS were pulped with water to given slurries containing about 30% solids, by weight. The slurries were treated in the same manner described in Example I except that sample D was leached for 2 hours rather than 1.5 hours.

The results are reported in Tables IVC and IVD. The results in Tables IVC and IVD again show that good nickel-copper separations can be obtained by practice of the process in accordance with the present invention. A copper concentrate containing about 15 to 20% copper and 5 to 10% nickel could have been recovered upon separation of the sulfide minerals from the sulfur pellets by known means.

TABLE IV-C

| Fraction | Wt/Vol. | Analysis of Fraction,[1] %, gpl | | | | | | Distribution[2], % | | | | | |
|---|---|---|---|---|---|---|---|---|---|---|---|---|---|
| | | Cu | Ni | Fe | TS | S° | SO₄ | Cu | Ni | Fe | TS | S° | SO₄ |
| Feed Solids | 600 g | 1.49 | 4.94 | 36.4 | 25.5 | — | — | 100 | 100 | 100 | 100 | — | — |
| Leach Solution | 1.4 l. | 1.69 | 18.3 | 6.71 | 22.8 | — | 68.4 | 26.3 | 86.5 | 4.2 | 21.8 | — | 21.8 |
| + 65 mesh pellets | 118.2 g | 5.17 | 1.98 | 6.14 | 81.1 | 75.6 | 0.12 | 67.8 | 7.9 | 3.3 | 65.4 | 61.4 | <0.1 |
| − 65 mesh tailings | 531.0 g | 0.10 | 0.31 | 38.4 | 3.53 | 0.19 | 5.87 | 5.9 | 5.6 | 92.5 | 12.8 | 0.7 | 7.0 |

[1] Analyses of solid Fractions are given in weight percent while analyses of liquid Fractions are given in grams per liter (gpl).
[2] Distribution is the percentage of the constituent reporting in the various Fractions, based on the amount initially present in Feed Fraction

TABLE IV-D

| Fraction | Wt/Vol. | Analysis of Fraction,[1] %, gpl | | | | | | Distribution[2], % | | | | | |
|---|---|---|---|---|---|---|---|---|---|---|---|---|---|
| | | Cu | Ni | Fe | TS | S° | SO₄ | Cu | Ni | Fe | TS | S° | SO₄ |
| Feed Solids | 600 g | 1.94 | 6.74 | 34.0 | 25.0 | — | — | 100 | 100 | 100 | 100 | — | — |
| Leach solution | 1.4 l. | 3.26 | 26.1 | 8.43 | 29.8 | — | 89.4 | 37.3 | 90.2 | 5.8 | 27.7 | — | 27.7 |
| + 65 mesh pellets | 105.1 g | 5.80 | 3.15 | 7.96 | 79.1 | 70.3 | 0.18 | 49.9 | 8.2 | 4.1 | 55.3 | 49.5 | <0.1 |
| − 65 mesh tailings | 505.7 g | 0.31 | 0.13 | 36.5 | 5.06 | 0.78 | 6.02 | 12.8 | 1.6 | 90.1 | 17.0 | 2.6 | 6.6 |

[1] Analyses of solid Fractions are given in weight percent while analyses of liquid Fractions are given in grams per liter (gpl).
[2] Distribution is the percentage of the constituent reporting in the various Fractions, based on the amount initially present in Feed Fraction.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A process for treating beneficiated ores and/or ore concentrates containing nickelferous sulfide minerals and cupriferous sulfide minerals both of which are associated with iron sulfides corresponding to the formula $Fe_xS_{x+1}$ wherein $x$ is a whole number greater than 1, wherein the mineral treated contains at least 5% by weight of pyrrhotite and the nickel and copper associated with the pyrrhotite are predominantly present in the form of pentlandite and chalcopyrite, to separate nickel values from copper sulfide minerals, which process comprises: establishing in an autoclave an aqueous slurry of said ores and/or ore concentrates; establishing a free-oxygen-containing atmosphere having an oxygen partial pressure of at least about 3 atmospheres over the slurry; maintaining the slurry at a temperature between about 80° and 110°C.; vigorously agitating the slurry to maintain a uniform dispersion of solids therein, to maximize oxygen transfer into the aqueous slurry from the atmosphere, to selectively convert iron sulfides to elemental sulfur and iron hydroxide and the nickeliferous sulfide minerals to nickel sulfate which are dissolved in the aqueous slurry to provide a nickel sulfate solution by oxidation reactions; terminating the oxidation reactions after a preponderant part of the iron sulfides and the nickeliferous sulfide minerals have been oxidized, the cupriferous sulfide minerals remaining substantially unoxidized; recovering nickel from the nickel sulfate solution; and recovering the unoxidized cupriferous sulfide minerals to provide a high grade cupriferous sulfide mineral concentrate.

2. The process described in claim 1 wherein the associated iron sulfide is a pyrrhotite-containing flotation concentrate.

3. The process as described in claim 1 wherein the sulfide minerals and the associated iron sulfides have a particle size of at least about 100% minus 100 mesh TSS.

4. The process as described in claim 1 wherein sulfuric acid or iron sulfate equivalent in amounts between about 1 gpl and 50 gpl is added to the slurry to accelerate the initial oxidation of iron and nickel sulfides.

5. The process as described in claim 1 wherein an oxygen partial pressure between about 3 atmospheres and 30 atmospheres is maintained over the slurry.

6. The process as described in claim 1 wherein the slurry is heated to a temperature between about 80° and 110°C.

7. The process as described in claim 1 wherein the slurry is formed with recycled leach liquor.

8. The process as described in claim 1 wherein after substantially all the nickel and iron sulfides have been oxidized the slurry is heated to a temperature above the melting point of sulfur to collect the cupriferous sulfide minerals and any precious metals that were associated with the sulfide minerals and to reject iron hydroxide and gangue.

9. The process as claimed in claim 8 wherein the slurry is heated to a temperature between about 120° and 200°C. to collect the cupriferous sulfide minerals.

10. The process described in claim 1 wherein the iron sulfide mineral contained in the ores and ore concentrates is a member of the group pyrrhotite and pyritic minerals, the nickeliferous sulfide is a member of the group pentlandite, millerite, heazlewoodite, polydymite, violarite, siegenite, and nickel arsenides, and the cupriferous sulfide mineral is a member of the group chalcopyrite, cubanite and bornite.

11. The process described in claim 1 wherein the mineral treated is a concentrate containing at least about 5% up to about 60% by weight pyrrhotite.

12. The process described in claim 2 wherein said minerals contain about 0.5 to about 2% nickel and from about 0.02 to about 1% copper.

13. The process described in claim 1 wherein the oxidation reaction is terminated after at least about 78.7% of the nickel is oxidized and dissolved in the leach solution.

14. The process as described in claim 1 wherein the oxidation reaction is terminated after substantially complete oxidation of the nickeliferous sulfide.

* * * * *